US012516819B2

(12) United States Patent
Hebert, Jr. et al.

(10) Patent No.: US 12,516,819 B2
(45) Date of Patent: Jan. 6, 2026

(54) AUTO-IGNITION APPARATUS FOR BACKPACKING STOVE

(71) Applicants: Michael Edward Hebert, Jr., Milford, NH (US); Alexander Paul Leger, Bangor, ME (US)

(72) Inventors: Michael Edward Hebert, Jr., Milford, NH (US); Alexander Paul Leger, Bangor, ME (US)

(73) Assignee: Johnson Outdoors Inc., Racine, WI (US)

( * ) Notice: Subject to any disclaimer, the term of this patent is extended or adjusted under 35 U.S.C. 154(b) by 369 days.

(21) Appl. No.: 18/304,866

(22) Filed: Apr. 21, 2023

(65) Prior Publication Data
US 2024/0353108 A1    Oct. 24, 2024

(51) Int. Cl.
*F24C 3/14* (2021.01)
*F23Q 3/00* (2006.01)

(52) U.S. Cl.
CPC ............... *F24C 3/14* (2013.01); *F23Q 3/008* (2013.01)

(58) Field of Classification Search
CPC .................................. F24C 3/14; F23Q 3/008
See application file for complete search history.

(56) References Cited

U.S. PATENT DOCUMENTS

| 4,348,172 | A * | 9/1982 | Miller ..................... F23Q 3/002 431/255 |
| 2004/0011350 | A1 | 1/2004 | Dowst et al. |
| 2014/0311475 | A1 * | 10/2014 | Dowst ..................... A47J 36/26 126/25 R |
| 2021/0127895 | A1 | 5/2021 | Van Peski |
| 2022/0225824 | A1 | 7/2022 | Glassman |
| 2023/0078302 | A1 * | 3/2023 | Glennon ................ F23N 1/002 126/41 R |

FOREIGN PATENT DOCUMENTS

| CN | 2710489 Y | 7/2005 |
| KR | 20-0117953 Y1 | 4/1998 |

OTHER PUBLICATIONS https://johnsonoutdoors.widen.net/content/wcfujng9xj/pdf/EUR_productmanual_SPRK_GrillI.pdf known prior to Jan. 1, 2023.

(Continued)

Primary Examiner — Alfred Basichas
(74) Attorney, Agent, or Firm — Reinhart Boerner Van Deuren P.C.

(57) ABSTRACT

A portable stove and a burner for a portable stove are provided. The portable stove may have a wind guard for protecting the flame of a burner of the portable stove. The wind guard may include a resilient arcuate member and a plurality of feet attached thereto for mounting the wind guard to a cook pot of the portable stove. The burner may have an ignitor that has an active configuration and an inactive configuration. A rotatable control knob can control a fuel flow control valve and activation of the ignitor. An ignition lever is interposed between the control knob and the ignitor such that rotation of the control knob from an on position to an ignition position transitions the ignition lever from a released position to an activation position and the ignitor from the inactive configuration to the active configuration.

18 Claims, 13 Drawing Sheets

(56) References Cited

OTHER PUBLICATIONS https://johnsonoutdoors.widen.net/content/4zx2djzcct/pdf/EUR_productmanual_SPRK.pdf known prior to Jan. 1, 2023.
https://johnsonoutdoors.widen.net/content/gkpbtiskfa/pdf/EUR_productmanual_SPRK Stove.pdf known prior to Jan. 1, 2023.
https://johnsonoutdoors.widen.net/content/twuky24zqx/pdf/JB_productmanual_Flash_Cooking_System.pdf known prior to Jan. 1, 2023.
https://johnsonoutdoors.widen.net/content/noz9wrmqio/pdf/JB_productmanual_MicroMo_MiniMo_SUMO.pdf known prior to Jan. 1, 2023.
https://johnsonoutdoors.widen.net/content/dvksi5cofq/pdf/JB_productmanual_Stash.pdf known prior to Jan. 1, 2023.
https://johnsonoutdoors.widen.net/content/ve7wscbkt/pdf/JB_productmanual_MightyMo.pdf known prior to Jan. 1, 2023.
https://www.msrgear.com/on/demandware.static/-/Library-Sites-cdiSharedLibrary/default/dw94dd85e7/pdf/manuals/06464_WindBurnerPersonalSystem_Instr_34-000-1_ENG.pdf known prior to Jan. 1, 2023.

\* cited by examiner

AUTO-IGNITION APPARATUS FOR BACKPACKING STOVE

FIELD OF THE INVENTION

This invention generally relates to portable stoves and particularly back packing stoves and to burners and flame protection of the burner of portable stoves.

BACKGROUND OF THE INVENTION

Portable stoves are used for many things when doing outdoor activities such as camping, hiking, tail gaiting, etc. The portable stove can be used for many things such as boiling water and cooking food.

The portable stove typically includes a source of fuel and a burner for combusting the fuel for generating heat. A cook pot may be located above the burner such that heat generated thereof heats the contents of the cook pot.

An ignition system may be provided to ignite the fuel in the burner. Creating a user friendly or simplified ignition system is desirable to avoid faulty lighting of the burner.

Further, protection of the flame of the burner can improve performance of the burner. Protecting the flame can prevent inadvertent distinguishing of the flame, uneven heating, inefficient heating.

To protect the flame, a wind guard may be employed that protects, at least in part, the flame from excessive wind. Setting up a wind guard can be dangerous. Depending on placement of the wind guard, the wind guard also presents an opportunity to overheat areas of the cookpot with trapped exhaust gas and/or overheat the fuel canister. Further, with a burner where multiple cookpots can be used, the size of the cookpot is a variable. Thus, prior burner-mounted or ground-mounted wind guards are challenging and often less desirable from a safety viewpoint.

The present application provides improvements over the current state of portable stoves and particularly portable stoves that include an integrated cook pot as well as for burners for portable stoves.

BRIEF SUMMARY OF THE INVENTION

The present application provides a new and improved portable stove that provides improvements in an ignition system as well as improvements over protection of the flame generated by the burner of the stove.

In one example, a burner for a portable camping stove is provided. The burner includes an ignitor, a control knob, an ignition lever and a fuel control valve. The ignitor has an active configuration wherein spark is generated by the ignitor and an inactive configuration wherein spark is not generated. The spark may be used to ignite fuel to generate heat. The control knob rotatable about a first axis between an off position and an ignition position. The control knob has a first on position rotationally interposed between the off position and the ignition position. An ignition lever is interposed between the control knob and the ignitor. The ignition lever transitions the ignitor from the inactive configuration to the active configuration when rotated about a second axis being non-parallel to the first axis between a released position and an activation position. The fuel flow control valve is operably coupled to the control knob. The fuel flow control valve is in an off configuration when the control knob is in the off position, is in a first on configuration when the control knob is in the first on position, and is in an ignition configuration when the control knob is in the ignition position. The ignition lever transitions from the released position to the activation position when the control knob transitions from the first on position to the ignition position. As such, the control knob controls both the setting of the fuel flow control valve as well as activation of the ignitor by its angular position about the first axis.

In one example, when in the activation position, a biasing member biases the ignition lever from the activation position towards the released position such that when no external force is applied to the knob that biases the knob towards the ignition position the biasing provided by the biasing member will transition the ignition lever and the knob to the released position and the first on position, respectively.

In one example, the biasing member is a spring.

In one example, the biasing member is a spring located within the ignitor.

In one example, the biasing member does not provide a biasing force to the control knob when the control knob is angularly positioned in or between the off position and the first on position.

In one example, an external force is required to transition the control knob into the ignition position and to maintain the control knob in the ignition position.

In one example, the control knob has a first abutment that is engaged with a second abutment of the ignition lever when the control knob transitions from the first on position to the ignition position.

In one example, the first abutment rotates the second abutment about the second axis when the first abutment rotates about the first axis as the control knob rotates from the first on position to the ignition position.

In one example, the fuel flow control valve permits at least the amount of fuel flow in the first on configuration as in the ignition configuration.

In another example, a portable stove includes a burner, a cook pot, and a wind guard. The cook pot is positionable above the burner. The cook pot includes a storage pot having an annular wall and a bottom wall defining a cooking chamber. The cook pot includes an annular skirt extending from the storage pot. The skirt has a plurality of radially directed flow ports for venting exhaust from the burner. The wind guard removably attaches to the annular skirt in vertical overlap with the plurality of radially directed flow ports. The wind guard has an arcuate wind shield formed from spring metal. A plurality of radially inward extending feet are configured to attach the wind guard to the skirt with the arcuate wind shield spaced radially outward from the skirt.

In one example, a plurality of mounting slots are formed in the skirt. Each foot of the plurality of radially inward extending feet extends into a corresponding mounting slot when the wind guard is mounted to the skirt.

In one example, the arcuate wind shield has a first radial dimension when in a relaxed state that is smaller than a second radial dimension when the wind shield is in a stretched state while mounting the wind guard to the skirt.

In one example, the annular wall of the storage pot has an inner third radial dimension greater than the first radial dimension such that the arcuate wind shield is insertable completely within the storage pot in the relaxed state.

In one example, the arcuate wind shield may be resiliently compressed to a compressed state such that the wind shield has a third radial dimension smaller than when the arcuate wind shield is in the relaxed state. The annular wall of the storage pot has an inner fourth radial dimension smaller than the second radial dimension. The third radial dimension being smaller than the fourth radial dimension such that the arcuate wind shield is insertable completely within the storage pot in the compressed state.

In one example, the feet extend into the slots when transitioning from the stretched state towards the relaxed state.

In one example, each foot has a radially inward extending insertion portion and a radially offset abutment portion. The abutment portion is positioned radially outward from the insertion portion and angular offset from the insertion portion. The insertion portion is received in the corresponding mounting slot while the abutment portion radially abuts an outer periphery of the skirt when the wind guard is mounted to the skirt.

In an example, the cook pot includes a heat flux ring position adjacent the bottom wall on an exterior of the storage pot. The annular skirt surrounds the heat flux ring.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
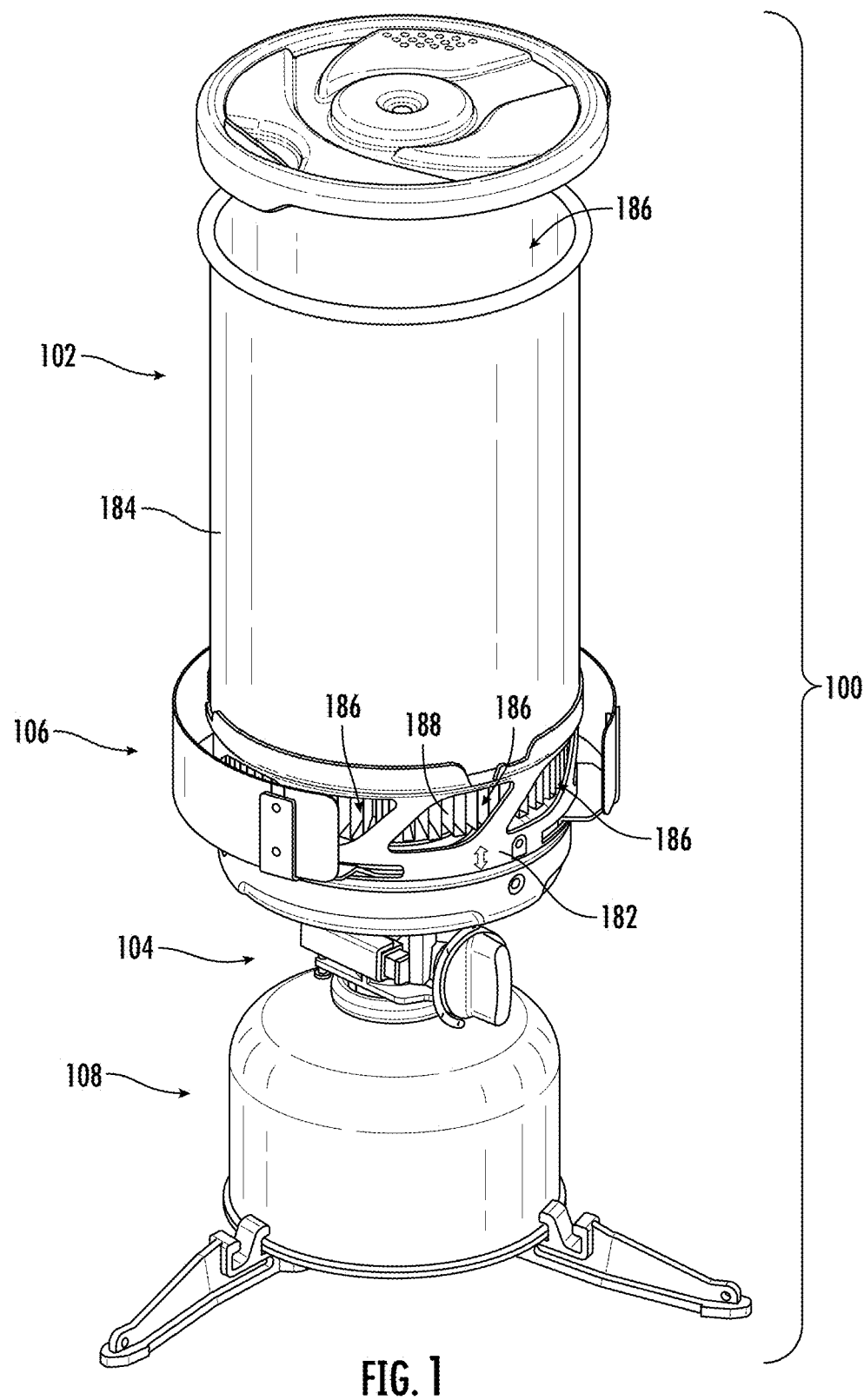
FIG. 1 is a perspective illustration of a portable stove according to the application.
Figure 2:
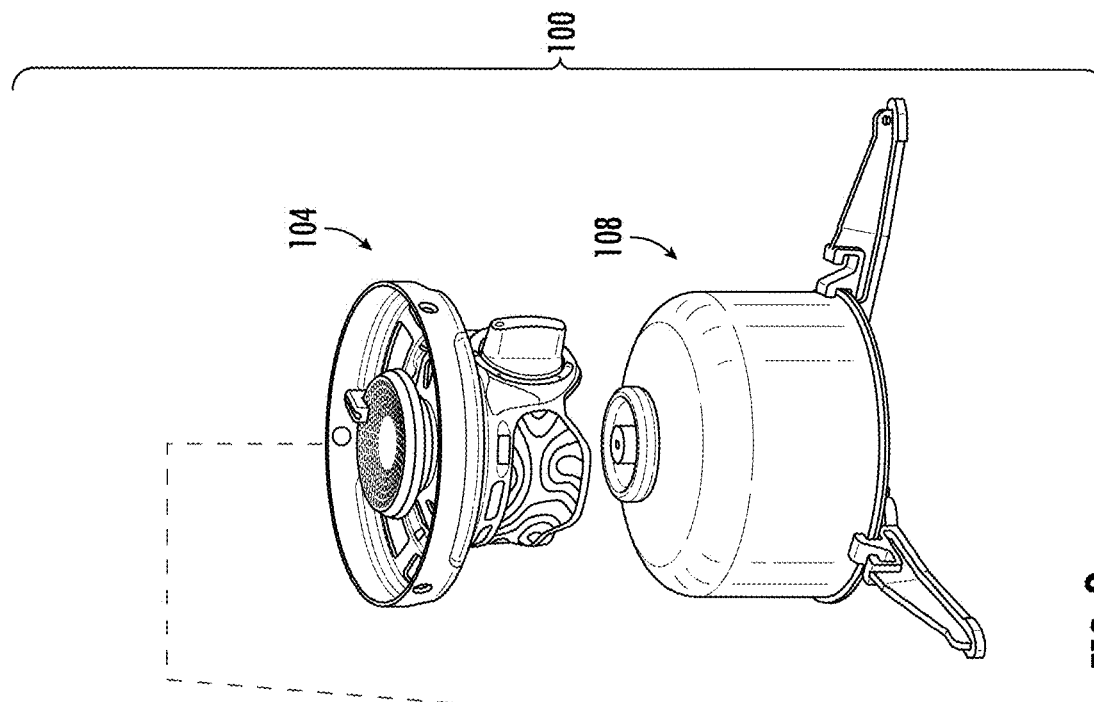
FIG. 2 is an exploded perspective illustration of the portable stove of FIG. 1.
Figure 2:
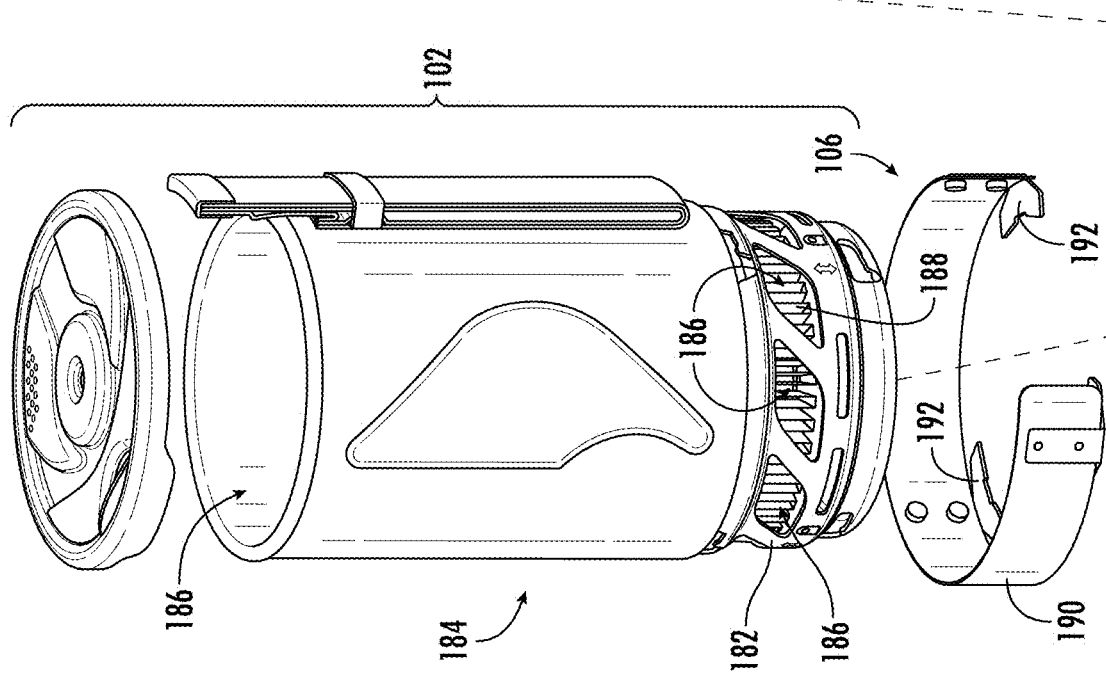

FIGS. 1 and 2 illustrates a portable stove 100 that generally includes a cook pot 102, a burner 104, a wind guard 106, and a fuel canister 108. FIG. 1 illustrates the portable stove 100 generally in an assembled state while FIG. 2 illustrates the portable stove 100 in an exploded state. The portable stove 100 is configured such that the illustrated components generally pack within the cook pot 102 for storage and transport.

With reference to FIGS. 3-9 illustrate the burner 104 and in particular operation of an ignition system for lighting the burner 104.

Control knob 120 controls fuel flow control valve 122 that adjusts the amount fuel flow through the system to adjust the amount of heat generated by the burner 104. The control knob 120 is rotatable about knob axis 124 to adjust the fuel flow control valve 122 between an off position 126, a high position 128, and an ignition position 130. In this example, the high position 128 is angularly between the off position 126 and the ignition position 130.

The knob 120 includes an indicator 132 that aligns with the corresponding indicators of positions 126, 128, 130. It is notable that the control knob 120 may be positioned at intermediate positions between the off position 126 and the high position 128 for further fine adjustment of the temperature output of burner 104.

The ignition system includes an ignitor 134 used to generate a spark for lighting the burner 104. The ignitor 134 includes a generator 136 operably coupled to an electrode 138. The spark is formed between the electrode 138 and burner cup 140 of burner 104.

Figure 3:
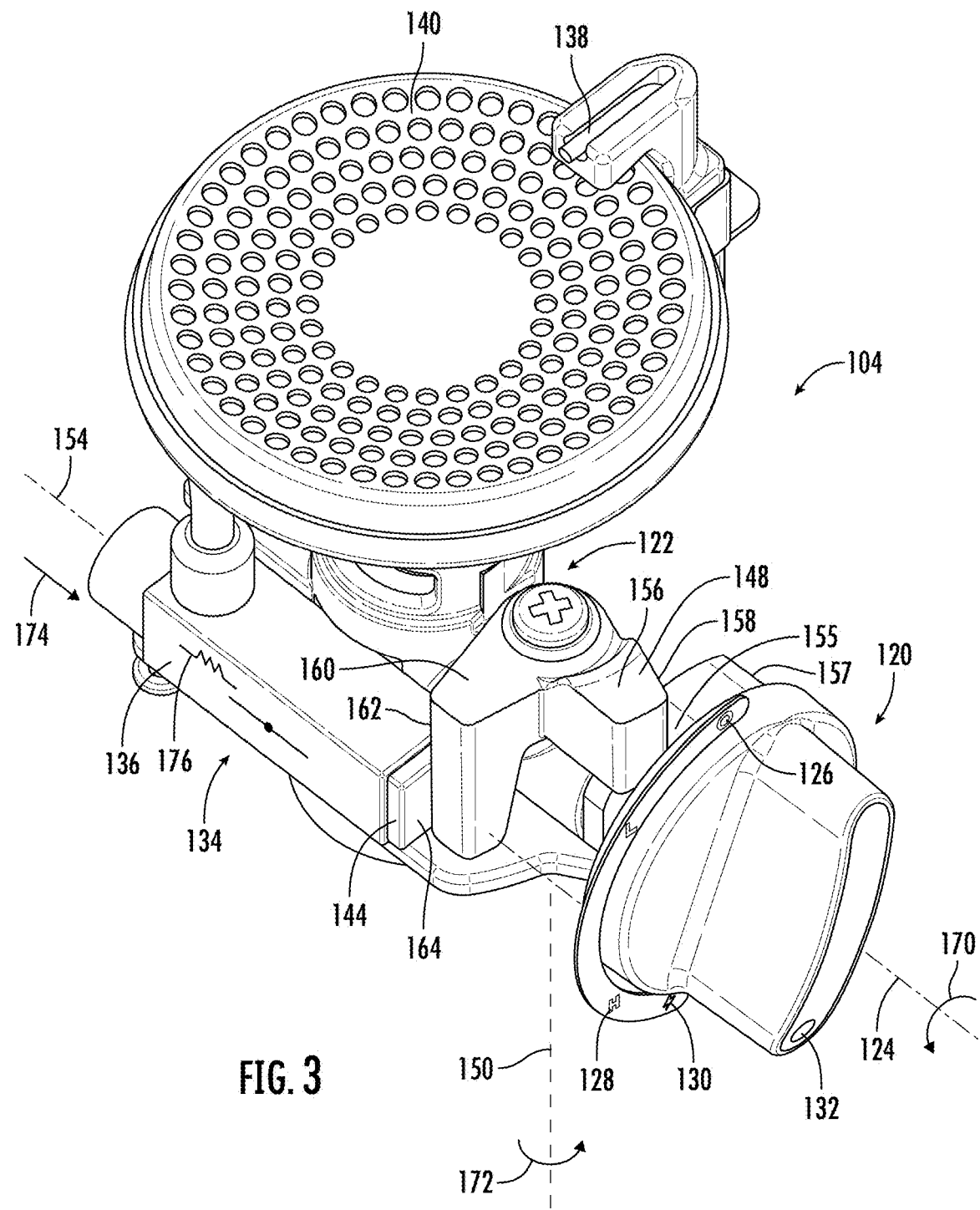
FIG. 3 is a perspective illustration of a burner of the portable stove of FIG. 1 in an ignition configuration.

In some examples, the generator 136 will be an electrically operated generator (e.g. a generator that has a power source such as a battery) such that when switch lever 144 is depressed (as illustrated in FIG. 3) to transition the generator from an inactive position to an active position, the electrical pulse is sent to electrode 138 to create the spark. In other examples, it is contemplated that a piezo electric generator could be used.

The generator 136 is operably activated by control knob 120 to create the electrical pulse that is sent to electrode 138. In particular, rotation of control knob 120 to the ignition position 130 transitions the generator 136 to the active configuration by operably depressing switch lever 144 such that the electrical pulse may be sent to electrode 138. Thus, the control knob 120 is used to both control the position of the control valve as well as activation of the ignitor 134.

When using a battery operated generator, as long as the switch lever 144 is depressed, the igniter 104 will continue to generate sparks with electrode 138.

To actuate switch lever 144, an ignition lever 148 is operably interposed between the control knob 120 and the switch lever 144. The ignition lever 148 engages the control knob 120 and the switch lever 144 and transitions the ignitor 134 from the inactive configuration to the active configuration.

The ignition lever 148 rotates about lever axis 150. In this embodiment, lever axis 150 is non-parallel to knob axis 124. In a preferred example, lever axis 150 is perpendicular to knob axis 124.

The ignition lever 148 converts the rotary motion of knob 120 about axis 124 to rotary motion of ignition lever 148 about axis 150 to linear motion of switch lever 144 along axis 154.

The control knob 120 has a first abutment 155 that is angularly facing about axis 124 that engages a second abutment 158 of a first arm 156 of the ignition lever 148. The engagement between the first and second abutments 155, 158 allows for sliding contact therebetween. The first abutment is provided by a rearward extending projection 157.

The projection 157 and corresponding first abutment 155 are radially offset from axis 124.

The ignition lever 148 has a second arm 160 that has a third abutment 162 that engages a fourth abutment 164 of the switch lever 144. In this example, the engagement between the third and fourth abutments 162, 164 allows for sliding contact therebetween.

In this example, the first and second abutments 155, 158 engage at a vertical location that is higher than the vertical location of where the third and fourth abutments 162, 164 engage.

The first and second arms 156, 160 are radially extending members and generally form an L-shaped profile when viewed along axis 150. Preferably, the first and second arms 156, 160 extend at angles of between 45-135 degrees relative to one another and preferably approximately 90 degrees.

Figure 4:
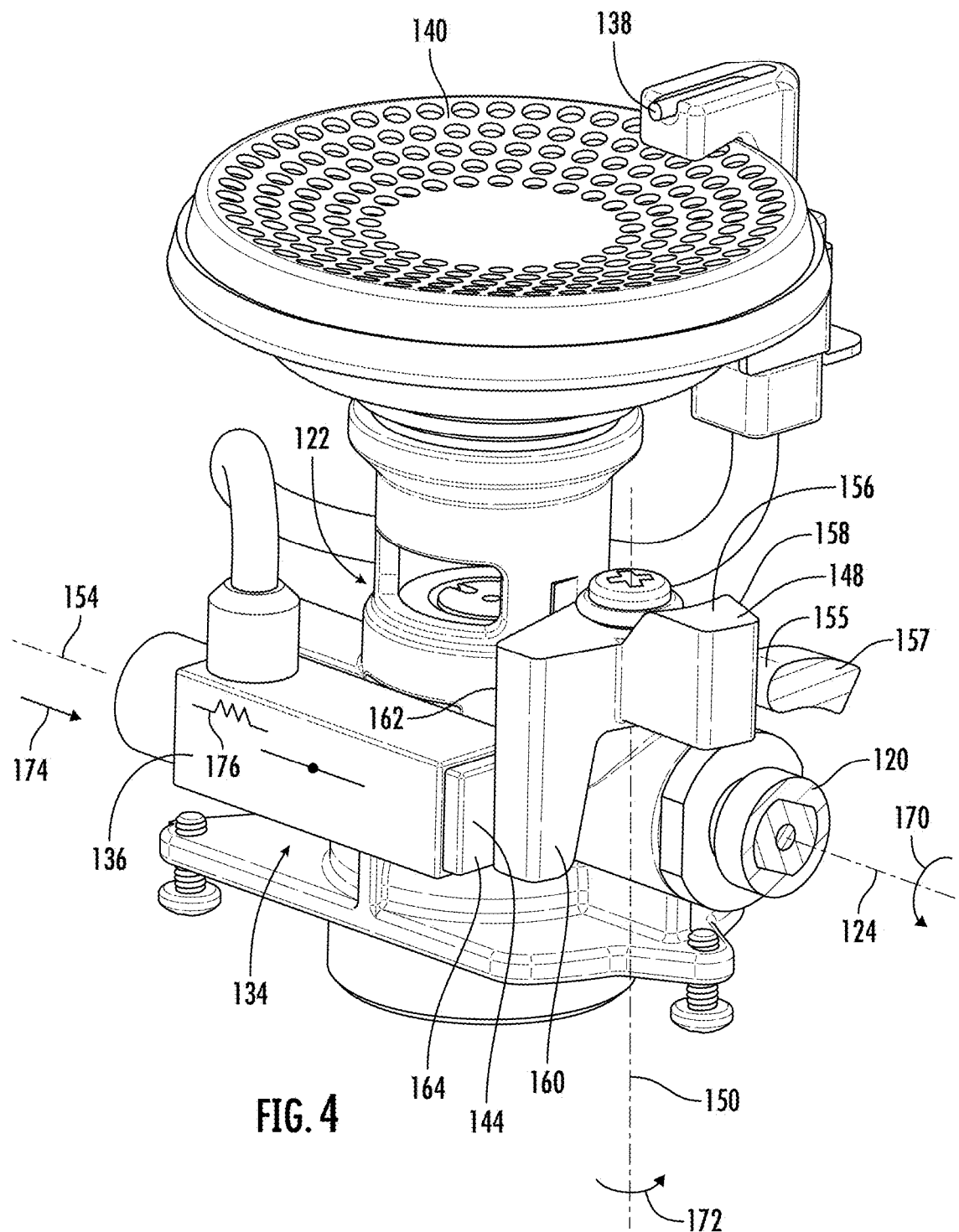
FIG. 4 is a partial perspective illustration of the burner of FIG. 3 in the ignition configuration.
Figure 5:
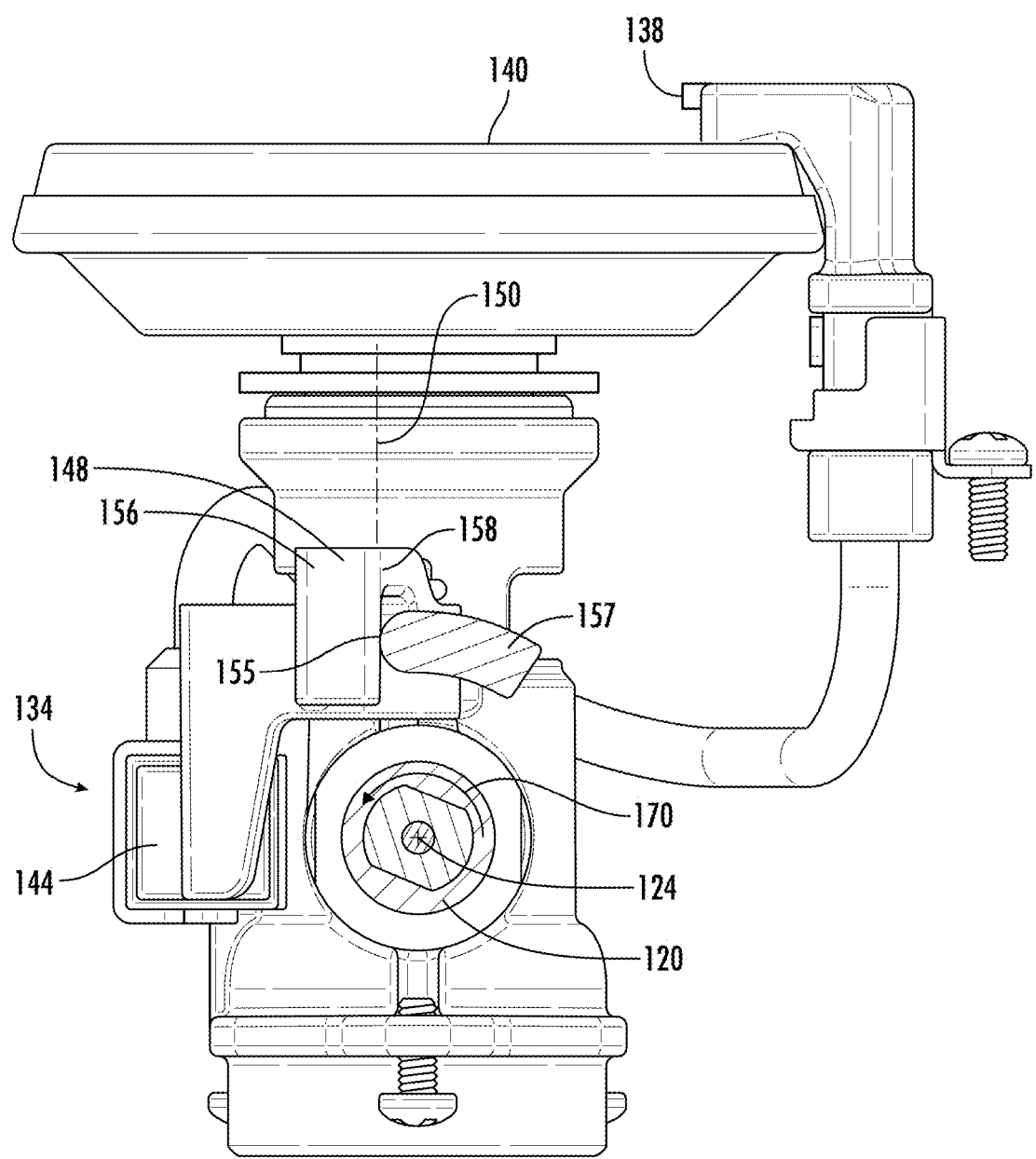
FIG. 5 is a cross-sectional illustration of the burner of FIG. 3 in the ignition configuration.

In FIGS. 3-5, the ignition lever 148 is in an activation position in which the switch lever 148 maintains the ignitor 134 in the active configuration (e.g. where spark is generated).

Figure 6:
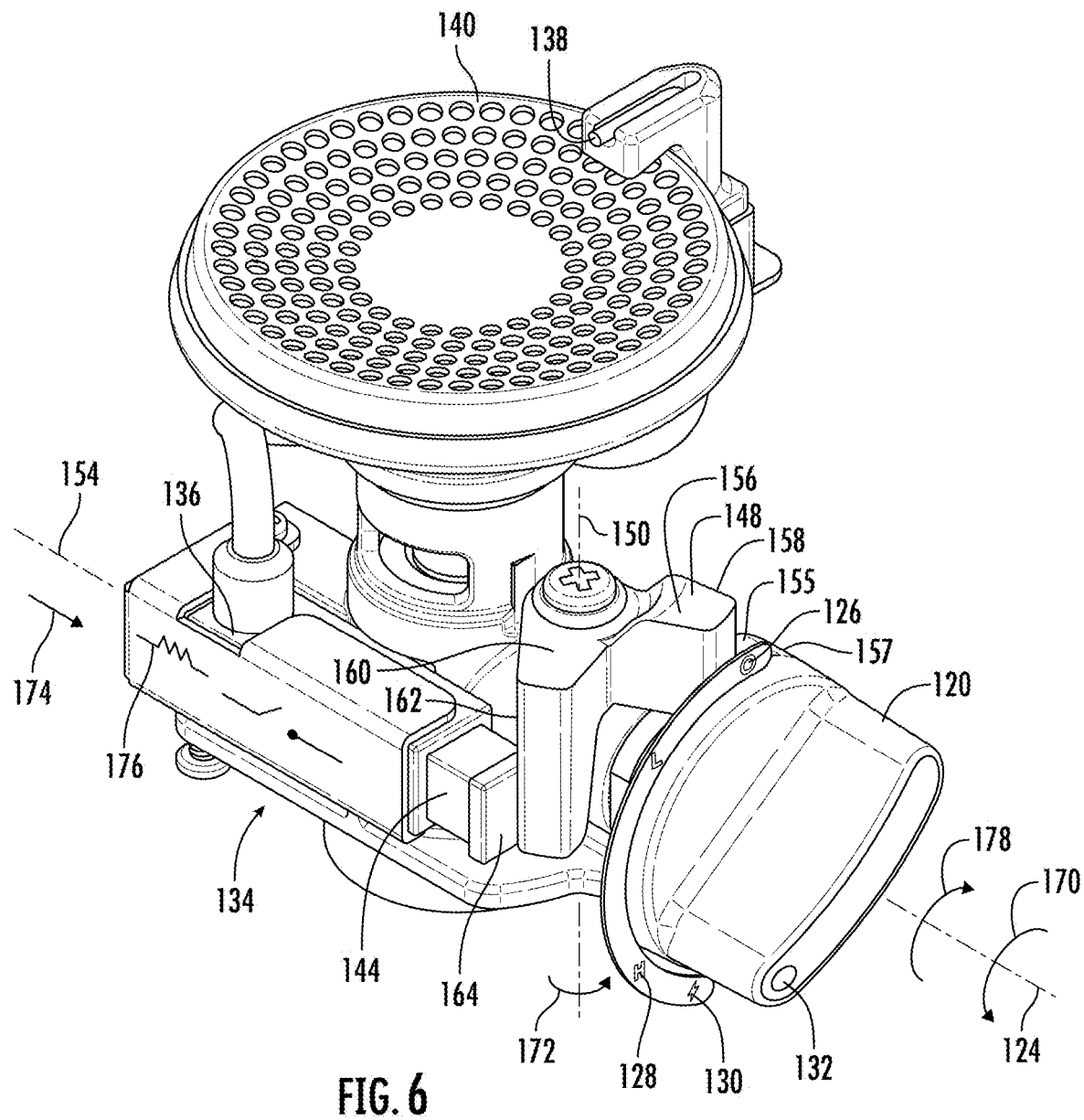
FIG. 6 is a perspective illustration of the burner of the portable stove of FIG. 1 in a cooking configuration that is between an off configuration and the ignition configuration.
Figure 7:
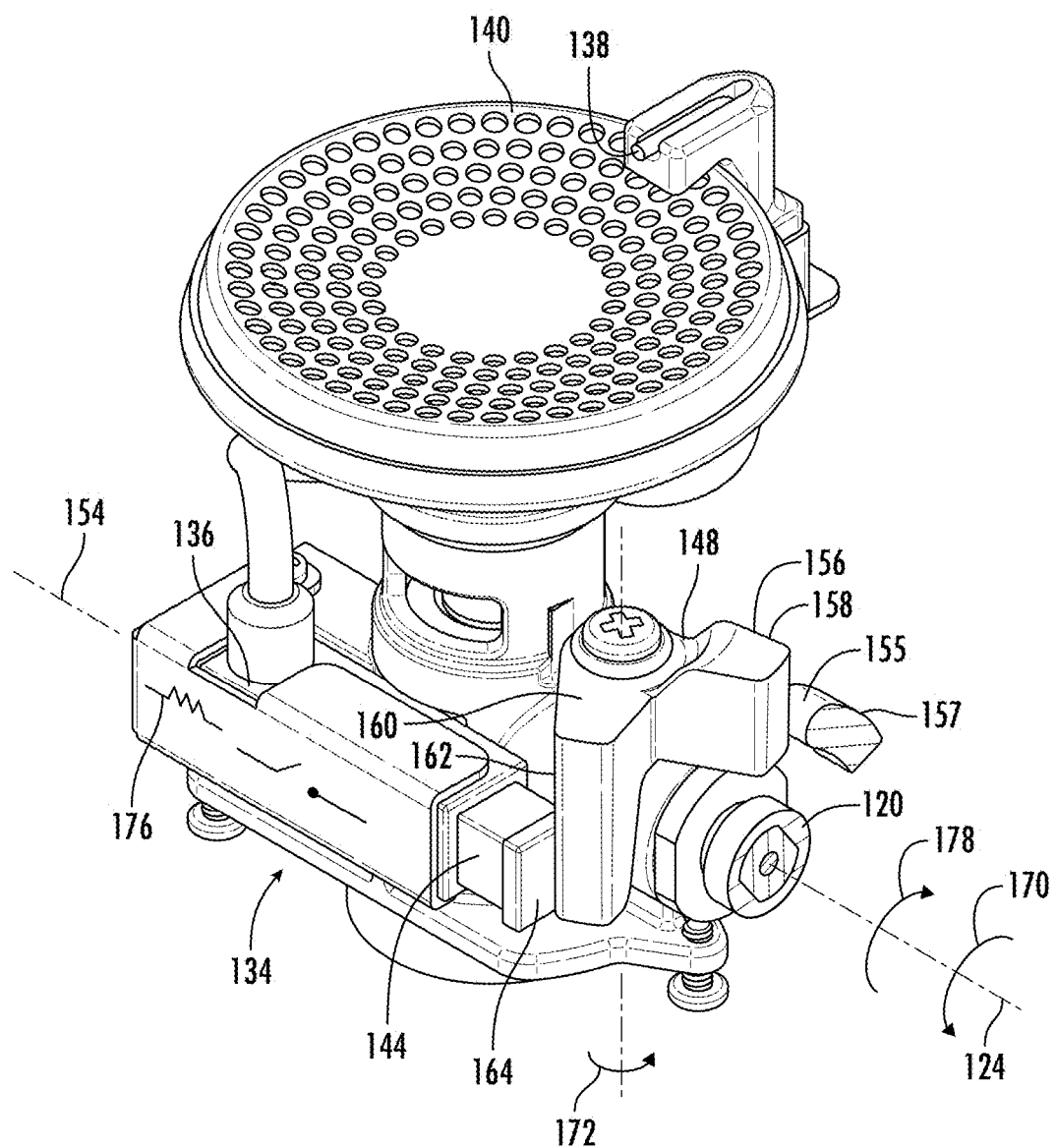
FIG. 7 is a cross-sectional perspective illustration of the burner in the configuration illustrated in FIG. 6.
Figure 8:
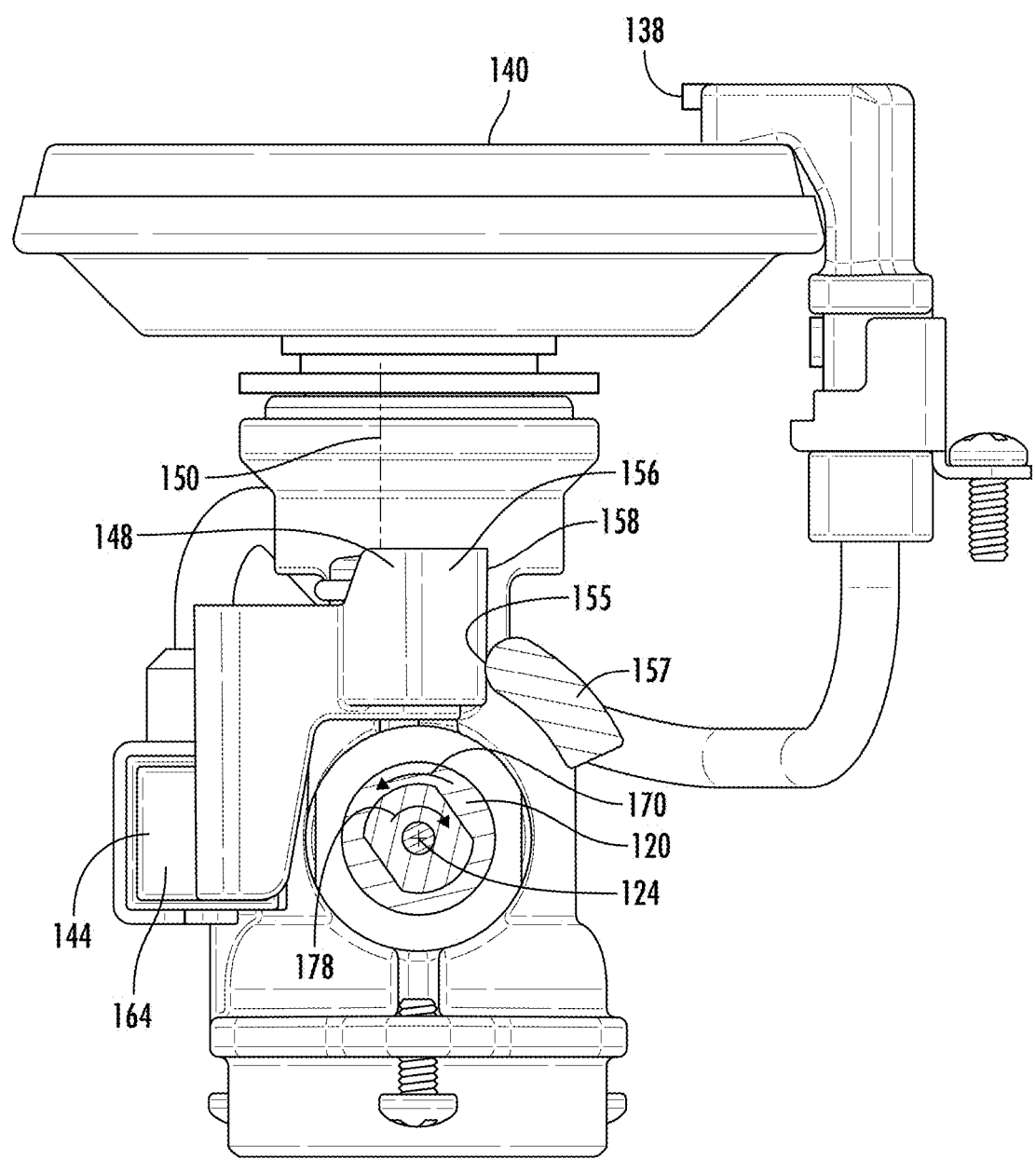
FIG. 8 is a cross-sectional illustration of the burner in the configuration illustrated in FIG. 6.

FIGS. 6-8 illustrate the ignition lever 148 in a released position that allows the ignitor to transition to the inactive configuration (e.g. where no spark is generated). In a preferred embodiment, a biasing force is operably applied to the ignition lever 148 to operably bias the ignition lever 148 towards the released position from the activation position. As such, a user must apply a force to the control knob 120 that overcomes this biasing force to transition from the released position to the activation position by rotating the control knob 120 from the high position to the ignition position. This external force applied to the knob 120 is illustrated by arrow 170. When this force 170 is removed, the biasing force will cause the ignition lever 148 to rotate about axis 150 as illustrated by arrow 172.

Preferably, switch lever 144 will also transition from the active configuration to the inactive configuration by sliding along axis 154 as illustrated by arrow 174 when force 170 is released.

In one example, a biasing member provides the biasing force that biases ignition lever 148 in the direction of arrow 172. In one particular example, the biasing force is provided by a spring 176 located within ignitor 134 that biases the switch lever from the active configuration towards the inactive configuration. As such, ignitor 134 is a normally open device (e.g. normally inactive).

This biasing force and the rotation of ignition lever 148 illustrated by arrow 172 will also rotate control knob 120 as illustrated by arrow 178. This rotates the control knob 120 from the ignition position 130 to the high position 128 (as illustrated in FIGS. 6-8). In particular, the spring force is transmitted from fourth abutment 164 to third abutment 162 to rotate ignition lever 148 about axis 150 as illustrated by arrow 172. This motion has second abutment 158 apply force to first abutment 155 that causes the control knob 120 to rotate about axis 124. Thus, when it is in the ignition position and the user releases the control knob 120 (e.g. when the burner 104 has been ignited), the system automatically transitions to the high position 128.

At that point, the system/control knob 120 is at steady state and the biasing force provided by the biasing member no longer acts or provides any sufficient force on the knob 120 to continue to rotate it towards the off position 126. The user can then apply further force in the direction of arrow 178 to the knob 120 to rotate towards the off position 126 to adjust the fuel flow valve 122 and the heat output of the burner 104.

A separate spring could be added to act on the ignition lever 148 and/or the knob 120 if the force of spring 176 is not sufficient to automatically transition from the ignition position/active configuration to the high position/inactive configuration.

When a piezo electric ignitor 134 is used, the user may have to turn the control knob 120 to the ignition position and release several times if several sparks are required to ignite the burner 104.

Again, when the when the knob 120 transitions from the high position 128 to the ignition position 130, the control knob 120 will begin to transition the ignition lever 148 from the released position towards the activation position and consequently to transition the ignitor 134 from the inactive configuration to the active configuration. The external force is required to maintain the knob 120 in the ignition position and to maintain the ignitor 134 in the active configuration.

The high position 128 may be considered an on position because in this position the valve is in a position that allows fuel flow and the burner 134 can be active. In the off position, fuel flow is stopped by the valve.

Figure 9:
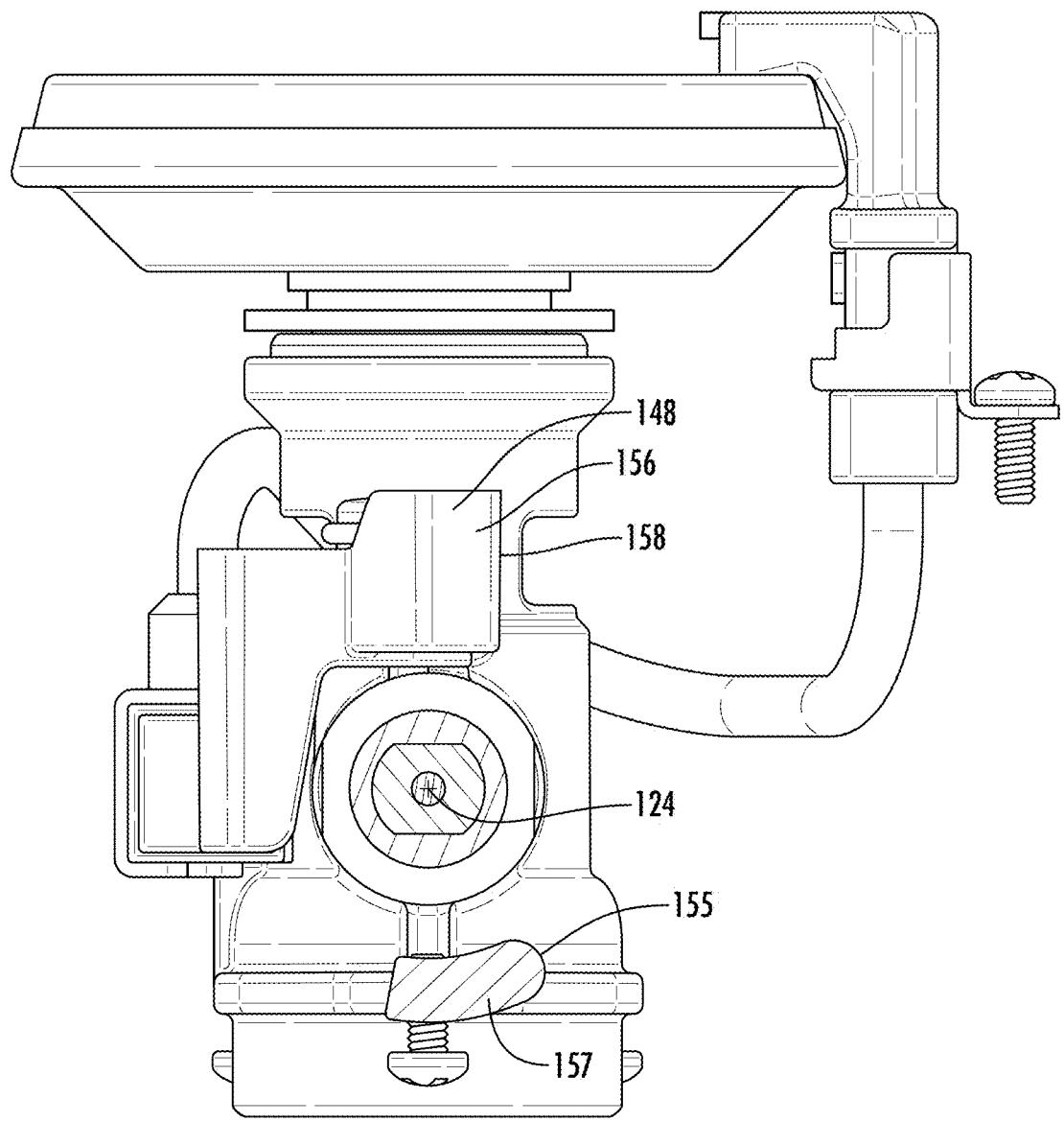
FIG. 9 is a cross-sectional illustration of the burner of the portable stove of FIG. 1 in an off configuration.

FIG. 9 illustrates the knob 120 rotated to the off position. Notably, the first abutment 155 is no longer engaged with the second abutment 158. However, the second abutment 158 is in the same position as when the knob 120 is in the high position and as illustrated in FIG. 8. Because of this relationship With initial reference to FIGS. 1 and 2, the portable stove 100 further includes the wind guard 106 that surrounds and vertically overlaps with an annular skirt 182 of the cook pot 102. In particular, the wind guard 106 overlaps with flow ports 186 formed through the annular skirt 182. The annular skirt 182 depends downward from a storage pot 184 of the cook pot 102.

The flow ports 186 allow for air flow under the bottom of the cook pot 102 to allow for heating of the cook pot 102.

Figure 10:
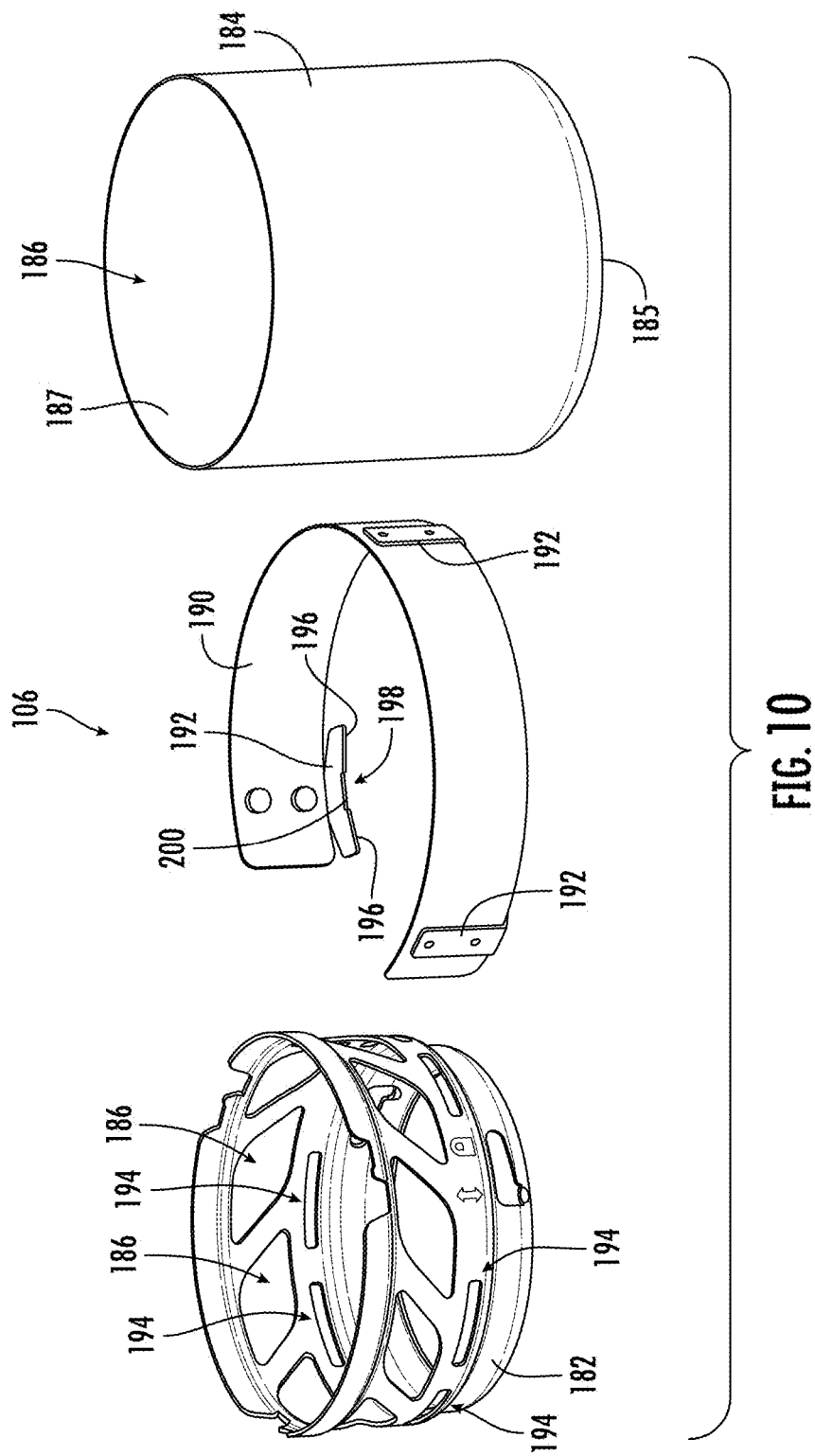
FIG. 10 is an exploded illustration of portions of the cook pot and wind guard of the portable stove of FIG. 1.

The storage pot 184 includes a bottom wall 185 and an annular sidewall 187 that defines a cooking chamber 186 (see also FIG. 10). The annular skirt 182 extends downward below the bottom wall of the storage pot 184. Further, a flux ring 188 may be provided adjacent bottom wall and within annular skirt 182. However, the flux ring 188 need not be provided in all embodiments. The combusted gas from burner 104 flows through the flux ring 188 and out flow ports 186.

The wind guard 106 covers some or all of the flow ports 186 and inhibits wind from blowing into burner 104 through flow ports 186, which could inhibit proper, efficient, and/or consistent combustion and/or heating of the cook pot 102.

The wind guard 106 includes an arcuate wind shield 190 formed from a resilient material, such as a spring metal and particularly spring steel. A plurality of mounting feet 192 extend radially inward from the wind shield 190 and operably mount the wind guard 106 to the skirt 182. In this example, the feet 192 are riveted to the wind shield 190 but they could be attached in other manners such as by way of screws, welding, unitary formation with the wind shield 190, adhesive, etc. For example, the feet could be formed as a continuous piece of material with the wind shield 190 and then simply bent radially inward to form standoffs for spacing the wind shield 190 radially outward from the skirt 182.

Figure 11:
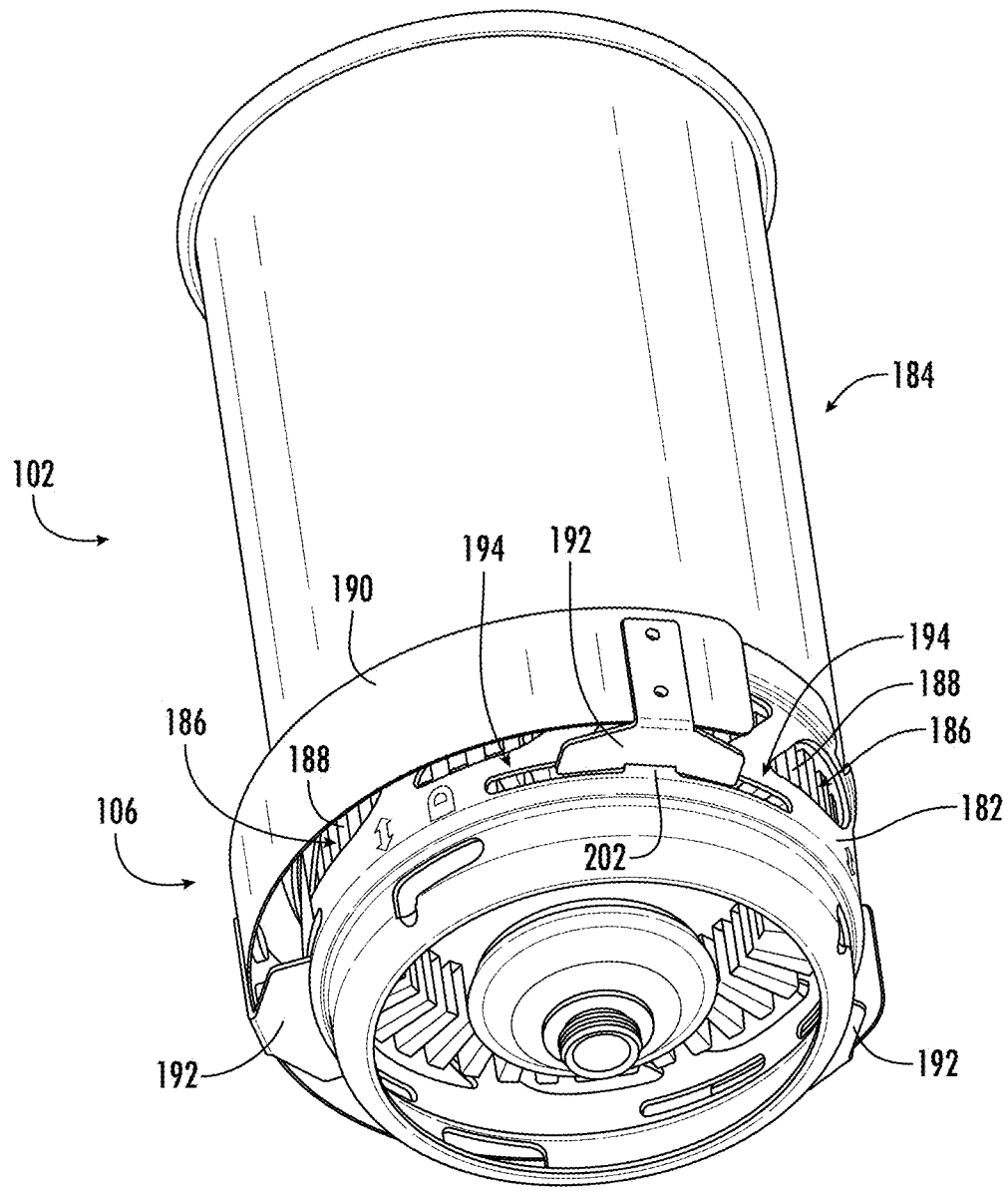
FIG. 11 is a perspective illustration of the cook pot and wind guard of the portable stove of FIG. 1 with the wind guard in a mounted configuration.
Figure 12:
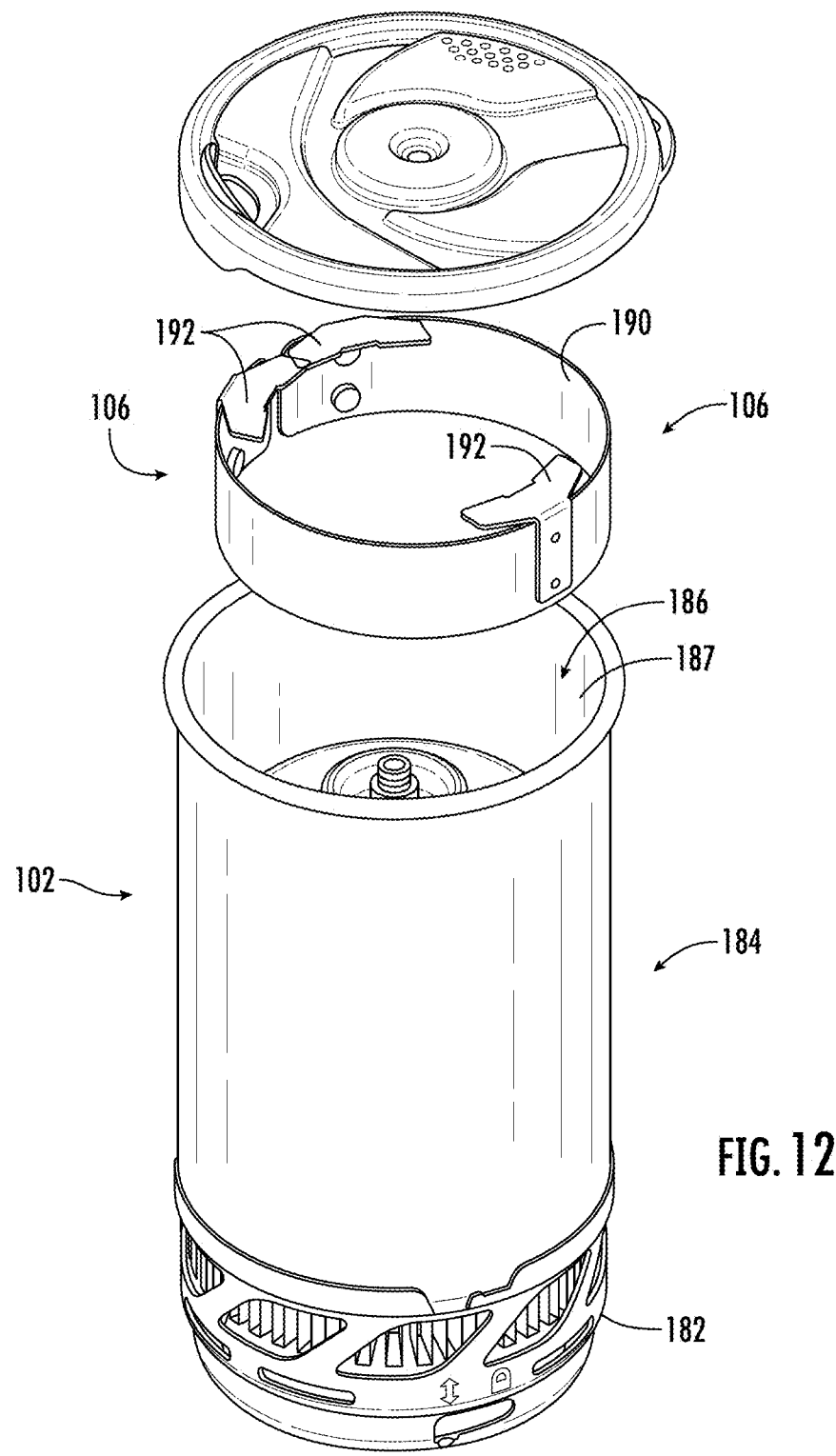
FIG. 12 is a perspective illustration of the cook pot and wind guard of FIG. 11 with the wind guard configured to be inserted into the cook pot.

With additional reference to FIGS. 10 and 11, the feet 192 cooperate with corresponding mounting slots 194 formed in the annular skirt 182. In this example, the feet 192 extend radially into mounting slots 194, when mounted. The feet 192 include a pair of radially, inward extending projections 196 that are separated angularly by a gap 198 and an abutment 200 that extends angularly therebetween.

As illustrated in FIG. 11, the pair of projections 196 extend into angularly spaced apart mounting slots 194 and abutment 200 is in radial abutment with an outer periphery of annular skirt 182 and particularly a portion 202 positioned between the spaced apart mounting slots 194. Portion 202 is radially received in gap 198. In other examples, only a single projection may be provided by a foot.

In an example, in a relaxed state, the wind shield 190 is sized such that the inner most portions of the feet 192 are sized such that they will not pass by the outer periphery of the skirt 182. As such, to mount the wind guard 106, the wind shield 190 must be resiliently flexed such that its inner radius is expanded to allow the feet 192 to slide axially along/past the outer periphery of skirt 182 and into alignment with mounting slots 194. Once aligned, the wind shield 190 can be released and it will resiliently transition back towards the relaxed state causing the feet 192 to extend into the mounting slots 194.

In an example, the wind shield 190 is sized such that it does not fully return to its relaxed state when mounted to skirt 182 with the feet 192 radially inserted into slots 194 so as to provide a tight engagement between the wind guard 106 and the skirt 182. However, in other examples, the relative sizes of the wind guard 106 and the skirt 182 can be such that the wind shield 190 could return to the relaxed state when the feet 192 are inserted into mounting slots 194.

While one configuration of feet 192 and mounting slots 194 is provided other shapes and sizes are contemplated. Further, the mounting slots 194 need not extend all the way through the skirt 182 and a mounting slot 194 could simply be a recess or groove formed into the skirt, e.g. by radial deformation of the skirt 182. Further, while three feet 192 are illustrated more or fewer feet are contemplated. In some examples, the engagement of the feet 192 with the mounting slots 194 prevents rotating the wind guard 106 about a central axis of the cook pot 184 when in a mounted state.

Figure 13:
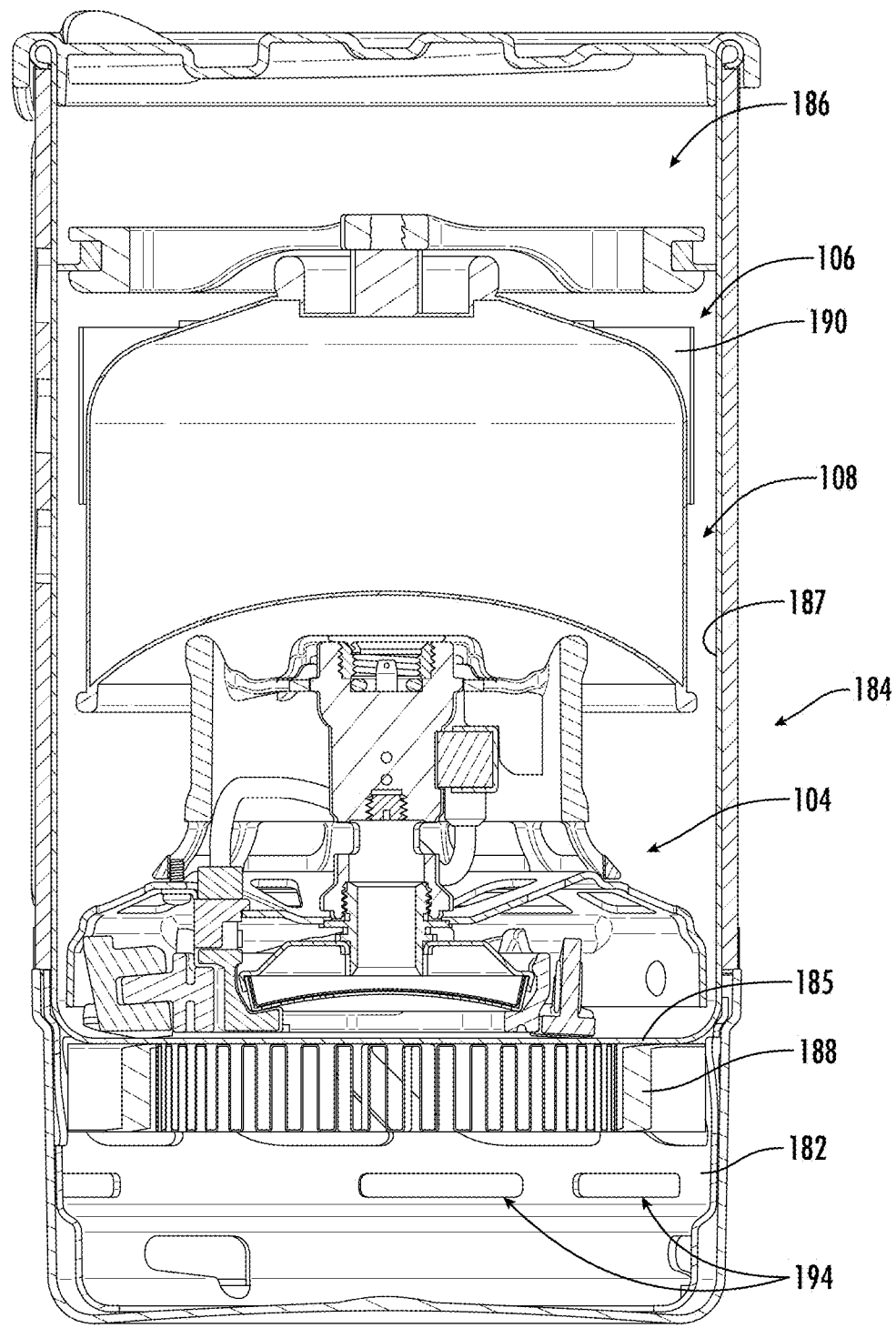
FIG. 13 is a cross-sectional illustration of the portable stove of FIG. 1 in a packaged configuration with the components of the stove inserted into the cook pot thereof as well as including a cup mounted to the cook pot around the annular skirt of the cook pot.

With additional reference to FIG. 13, the wind shield 190 is configured such that it can be completely inserted into the storage chamber 186 of the cook pot 184 for storage when the portable stove 100 is not in user or during transport. In one example, the wind shield 190 has an outer radius when in a relaxed state that is smaller than an inner radius of the cook pot 184. In an alternative example, the wind shield 190 may have a relaxed state in which the wind shield 190 has a larger radius than the inner radius of the cook pot 184. However, in this example, the wind shield 190 may be radially resiliently compressed such that it has a smaller radius than the inner radius of the cook pot 184 such that it can be stored within the cook pot.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A burner for a portable camping stove comprising:
an ignitor having an active configuration wherein spark is generated by the ignitor and an inactive configuration wherein spark is not generated;
a control knob rotatable about a first axis between an off position and an ignition position, the control knob having a first on position rotationally interposed between the off position and the ignition position;
an ignition lever interposed between the control knob and the ignitor, the ignition lever transitions the ignitor from the inactive configuration to the active configuration when rotated about a second axis being non-parallel to the first axis between a released position and an activation position;
a fuel flow control valve operably coupled to the control knob, the fuel flow control valve being in an off configuration when the control knob is in the off position, a first on configuration when the control knob is in the first on position, and an ignition configuration when the control knob is in the ignition position;
wherein the ignition lever transitions from the released position to the activation position when the control knob transitions from the first on position to the ignition position such that rotation of the control knob causes activation of the ignitor.

2. The burner of claim 1, further including a biasing member biasing the ignition lever, when in the activation position, from the activation position towards the released position such that when no external force is applied to the knob that biases the knob towards the ignition position, the biasing provided by the biasing member will transition the ignition lever and the knob to the released position and the first on position, respectively.

3. The burner of claim 2, wherein the biasing member is a spring.

4. The burner of claim 3, wherein the biasing member is a spring located within the ignitor.

5. The burner of claim 2, wherein the biasing member does not provide a biasing force to the control knob when the control knob is angularly positioned in or between the off position and the first on position.

6. The burner of claim 1, wherein an external force is required to transition the control knob into the ignition position and to maintain the control knob in the ignition position.

7. The burner of claim 1, wherein the control knob has a first abutment that is engaged with a second abutment of the ignition lever when the control knob transitions from the first on position to the ignition position.

8. The burner of claim 7, wherein the first abutment rotates the second abutment about the second axis when the first abutment rotates about the first axis as the control knob rotates from the first on position to the ignition position.

9. The burner of claim 1, wherein the fuel flow control valve permits the same amount of fuel flow in the first on configuration as in the ignition configuration.

10. A portable stove comprising:
    a burner of claim 1;
    a cook pot removably positionable above the burner, the cook pot having:
        a storage pot having an annular wall and a bottom wall defining a cooking chamber;
        an annular skirt extending from the storage pot, the skirt having a plurality of radially directed flow ports for venting exhaust from the burner;
    a wind guard removably attachable to the annular skirt in vertical overlap with the plurality of radially directed flow ports, the wind guard having:
        an arcuate wind shield formed from spring metal;
        a plurality of radially inward extending feet configured to attach the wind guard to the skirt with the arcuate wind shield spaced radially outward from the skirt.

11. The portable stove of claim 10, wherein a plurality of mounting slots are formed in the skirt, each foot of the plurality of radially inward extending feet extends into a corresponding mounting slot when the wind guard is mounted to the skirt.

12. The portable stove of claim 10, wherein the arcuate wind shield has a first radial dimension when in a relaxed state that is smaller than a second radial dimension when the wind shield is in a stretched state while mounting the wind guard to the skirt.

13. The portable stove of claim 12, wherein the annular wall of the storage pot has an inner third radial dimension greater than the first radial dimension such that the arcuate wind shield is insertable completely within the storage pot in the relaxed state.

14. The portable stove of claim 12, wherein:
    the arcuate wind shield may be resiliently compressed to a compressed state such that the wind shield has a third radial dimension smaller than when the arcuate wind shield is in the relaxed state;
    the annular wall of the storage pot has an inner fourth radial dimension smaller than the second radial dimension, the third radial dimension being smaller than the fourth radial dimension such that the arcuate wind shield is insertable completely within the storage pot in the compressed state.

15. The portable stove of claim 12, wherein the feet extend into mounting slots formed in the skirt when transitioning from the stretched state towards the relaxed state.

16. The portable stove of claim 10, wherein each foot has a radially inward extending insertion portion and a radially offset abutment portion, the abutment portion being positioned radially outward from the insertion portion, the insertion portion being received in the corresponding mounting slot while the abutment portion radially abutting an outer periphery of the skirt when the wind guard is mounted to the skirt.

17. The portable stove of claim 10, wherein the cook pot includes a heat flux ring position adjacent the bottom wall on an exterior of the storage pot, the annular skirt surrounding the heat flux ring.

18. The portable stove of claim 10, wherein the wind guard remains with the cook pot when the cook pot is removed from the burner.

* * * * *